Dec. 19, 1967 J. L. NAGLOWSKI ETAL 3,359,493

CIRCUIT OF PHASE-SENSITIVE DETECTOR

Filed Dec. 29, 1964 2 Sheets-Sheet 1

Note: Amplitudes are not to scale.
Note: Signals M and N are similar to signals D and E respectively.

3,359,493
CIRCUIT OF PHASE-SENSITIVE DETECTOR
Jerzy Leslaw Naglowski, Goszczynskiego Str. 36, and Stefan Urbanski, Rozlucka Str. 10, both of Warsaw, Poland
Filed Dec. 29, 1964, Ser. No. 421,835
Claims priority, application Poland, Jan. 7, 1964, P 103,415
2 Claims. (Cl. 324—87)

The object of this invention is the circuit of a phase-sensitive detector for the detection of signals having a predetermined frequency but appearing in presence of heavy interference or noise background. The circuit is characterized by very good linearity of the detection law, good stability and good efficiency of the required-signal detection, high zero stability with time and reference signal frequency changes, wide frequency range of the detected signals and the possibility of proper functioning despite signal-to-noise ratios considerably below unity.

The known circuits of phase-sensitive detectors use the ring-detection principle or its modifications; the detected as well as the reference signal is applied to such detectors by means of transformers or conventional amplifier circuits. The disadvantage of such circuits consists in difficulties with proper matching of the source impedance of the signal-to-be-detected and the reference signal to the detector input impedances (dependent on the amplitude ratio of the two signals), in order to obtain linear detection over a wide frequency range at maximum detection efficiency with good zero and detection stability in function of time, temperature and frequency. The circuit of the phase-sensitive detector according to the invention allows these disadvantages to be avoided. Its novelty consists in the introduction of high loop gain negative feedback to a transformer-free circuit, with the loop including the detector bridge together with rectifier components and associated amplifiers. The negative feedback acts on the signal-to-be-detected as well as the reference signal, providing good linearity of the detection law at higher as well as at lower signal amplitudes, high detector efficiency, equalisation of frequency and phase response of the circuit, automatic zero balance in absence of the detected signal, constant detector efficiency in function of time, temperature, and frequency, and finally in the independence of the detection efficiency on interference and noise signals the level of which may extend a few times that of the signal-to-be-detected.

As seen in the diagram the terminal A constitutes the input of two identical amplifiers 1 and 2 for a signal-to-be-detected, which can be covered by considerably stronger interference or noise signals; terminals B and C constitute a balanced-in-respect-to-ground input for the reference signal which is synchronous with detected signal. The amplified signal, which is a product of algebraic summation of the reference signal and the signal applied to terminal A will be developed at terminals D and E, being the outputs of amplifiers 1 and 2, respectively.

The detector bridge connected across terminals D, E and circuit ground consists of four rectifying components 3, 4, 5, 6 and eleven resistors 7, 8, 9, 10, 11, 12, 13, 14, 15, 16, 17. The terminals F and G constitute the circuit output; the detected signal can be delivered from these terminals into balanced loads, or from any one of these termials and ground into unbalanced loads. Negative feedback signals are derived from terminals M and N to amplifiers 1 and 2, respectively. The signals comprise a portion of the reference signal as well as a portion of the signal-to-be-detected, and the amplitude ratio of these can be adjusted by selecting the resistance value of resistors 7, 8, 9, 13 and 11, 12, 10, 13. The operation of the phase-sensitive detector bridge connected between terminals D, E, F, G, is based on the well known principle of controlling the conductivity of the rectifying components in the bridge by a reference signal: during one half of the reference wave the upper bridge arm rectifying components are conducting, while during the other half wave only the lower arm will conduct. If the reference signals at terminals D and E are balanced in respect to circuit ground, and the resistor components of the detector bridge remain balanced in respect to F and G, no reference signal will be present at the latter terminals. If moreover the signal-to-be-detected has, say, 0° shift against the reference signal phase at terminal D or 180° against the reference signal phase at terminal E, a complex signal will be developed at terminal G, consisting of positive waves of the detected signal sine-wave; while the negative waves of the detected signal will be accessible at terminal F. Thus at terminal G the positive, and at terminal F the negative D.C. component will be established, the amplitude of which will be proportional to that of the signal-to-be-detected.

Should the phase shift between the signal-to-be-detected and the reference signal differ from 0° or 180°, the D.C. components at terminals G and F will be smaller, and will to zero for 90° or 270° phase shifts respectively. No D.C. components will be produced at terminals G and F due to noise and interference signals not related in respect to phase to the reference signal.

Figure 1:
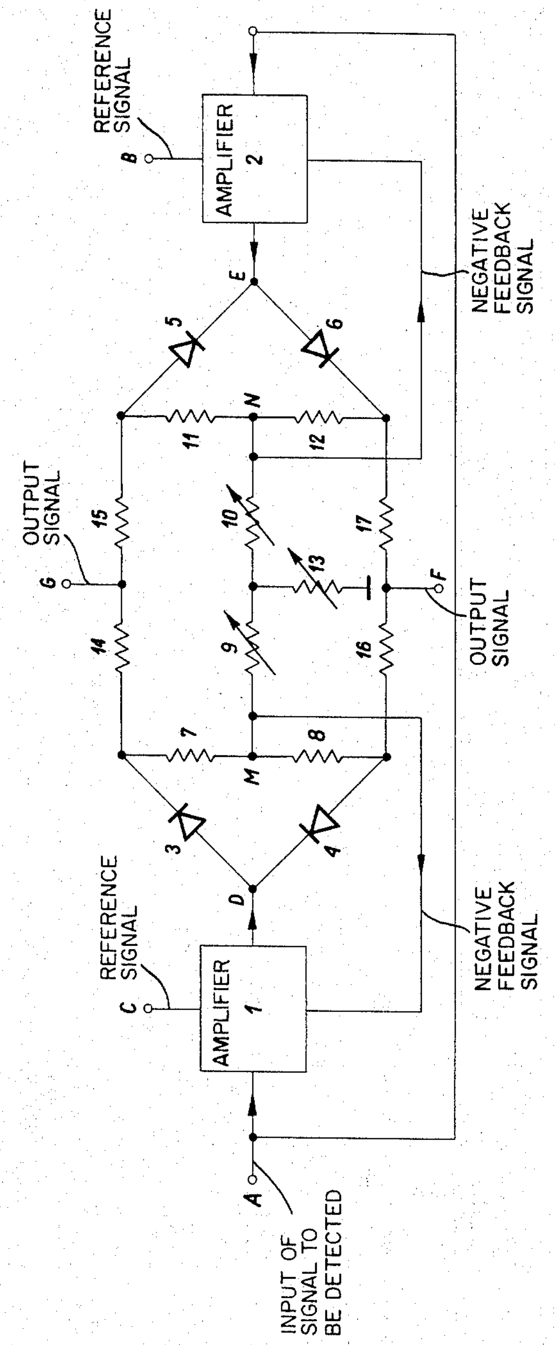
FIGURE 1 is a schematic illustration of the circuit of the phase-detector according to the present invention.
Figure 2:
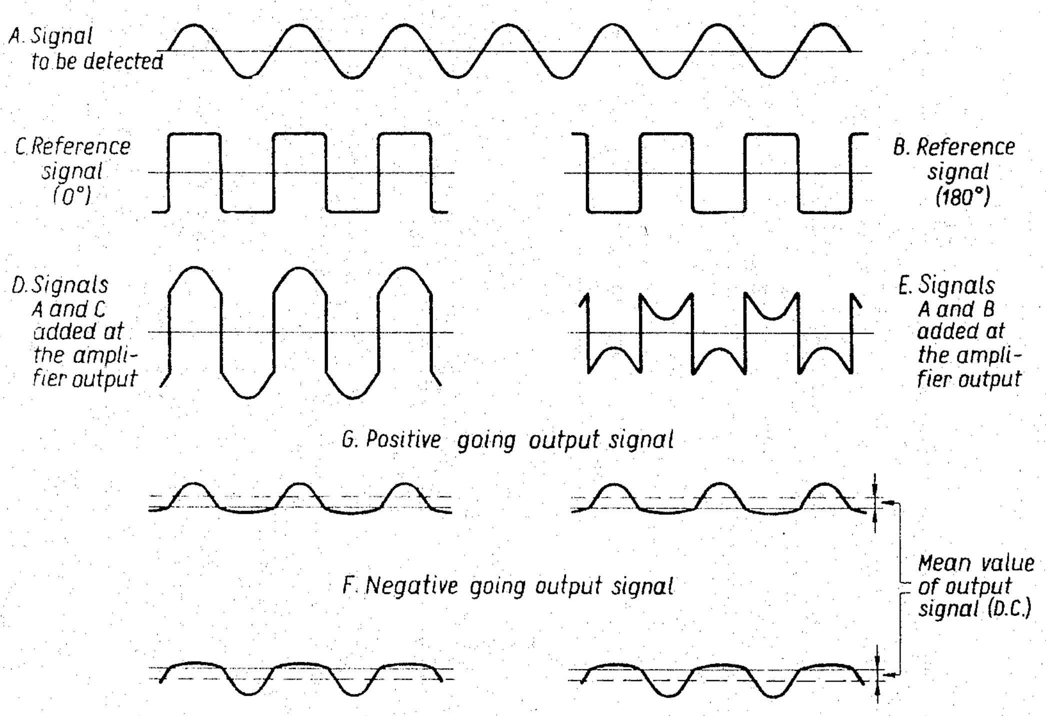
FIGURE 2 illustrates the wave forms at various points in the circuit, the letters adjacent to each wave form corresponding to the point in the circuit indicated by that letter.

The waveforms at various points in the circuit are illustrated in FIGURE 2. Curve A represents a typical signal which may be applied to signal input terminal A. As is well known in the phase-sensitive detector art (as illustrated, for example, in United States Patents No. 2,790,898, No. 2,830,180, and No. 3,184,608) a square wave may be used as the reference wave. This is shown in curves B and C which show reference waves which may be applied to terminals B and C. These two reference waves are 180 degrees out of phase with reference wave C being designated in the figure as being 0° phase and referance B being there designated as being 180° phase. The signal-to-be-detected and reference signal C are algebraically added in amplifier 1, and the composite wave appearing at amplifier output terminal D is shown by curve D. Likewise, the signal to be detected and reference wave B are algebraically added in amplifier 2, the combined output being shown in curve E.

It will thus be observed that during the first half cycle of the reference waves, terminal D will have a positive voltage applied thereto, while the voltage at terminal E will be negative. This will cause rectifier 3 and rectifier 5 to conduct, applying positive going output signals through resistors 14 and 15 to terminal G. In like manner, on the succeeding half cycle of the reference waves, rectifiers 4 and 6 will become conductive; and the negative going output signal as illustrated by curve F will be applied to signal output terminal F. The direct current mean values of the output signals will be a function of the extent the signal-to-be-detected is out of phase with the reference signal.

It will be observed that during the first half-cycle of the reference waves rectifier 3, resistor 7, resistor 9, and resistor 13 form a voltage divider for the signal appearing at terminal D, while rectifier 5, resistor 11, resistor 10, and resistor 13 form a voltage divider with respect to the signal appearing at terminal E. Likewise, in the next half cycle of the reference waves, rectifier 4, resistor 6, resistor 9, and resistor 13 form a voltage divider for the signal appearing at terminal D; and rectifier 6, resistor 12, resistor 10, and resistor 13 form a voltage divider as to the signal appearing at terminal E. Thus, signals are present at terminals M and N, which are respective portions of the signals applied to terminals D and E. The ratio of the detected signal amplitude to the reference signal amplitude can be adjusted at terminals M and N by means of resistor 13. Since the reference signal components which are applied to terminals D and E are 180° out of phase, with the resistor components of the detector bridge balanced no reference signal components will appear at the junction between resistors 9 and 10. Thus, the reference signal components at terminals M and N are unaffected by the value of resistance 13; and value of its resistance does not affect the negative feedback loop gains in respect to the reference signals. On the other hand, the components of the signal-to-be-detected appearing at points M and N are of the same phase, are not cancelled at the junction of resistors 9 and 10, and are thus affected by the value of resistor 13. However, the negative feedback loop gains with respect to the reference signals and the signal-to-be-detected may both be adjusted by resistors 9 and 10. Signals derived from terminals M and N are applied to amplifiers 1 and 2, respectively, in such a manner that they act as negative feedback signals.

What we claim is:

1. A phase sensitive signal detector circuit having good detection linearity, good zero stability, high detection efficiency unaffected by time, temperature, frequency, and interference signals and operating over a wide frequency range comprising: a signal input terminal for providing a signal-to-be-detected; a pair of signal output terminals; first and second electrically identical amplifiers, each having first, second, and third amplifier input terminals and an amplifier output terminal; means connecting said signal input terminal to said first amplifier input terminals of said amplifiers in parallel; means providing a first reference signal to said second amplifier input terminal of said first amplifier; means providing a second reference signal, 180 degrees out of phase with said first reference signal, to said second amplifier input terminal of said second amplifier; ring detector circuit means comprising a first arm having a first rectifier and a first impedance connected in series in the order named between said amplifier output terminal of said first amplifier and one of said signal output terminals, a second arm having a second rectifier and a second impedance connected in series in the order named between said amplifier output terminal of said first amplifier and the other of said signal output terminals, a third arm having a third rectifier and a third impedance connected in series in the order named between said amplifier output terminal of said second amplifier and said other of said signal output terminals, and a fourth arm having a fourth rectifier and a fourth impedance connected in series in the order named between said amplifier output terminal of said second amplifier and said one signal output terminal; a first pair of resistors connected in series between the junction of the rectifier and impedance of said first arm and the junction of the rectifier and impedance of said second arm; a second pair of resistors connected in series between the junction of the rectifier and impedance of said third arm and the junction of the rectifier and impedance of said fourth arm, whereby a first composite signal comprising a signal-to-be-detected component and a first reference signal component will appear at the junction between the first pair of resistors and a second composite signal comprising a signal-to-be-detected component and a second reference signal component will appear at the junction between the second pair of resistors; first negative feedback loop means for applying said first composite signal as a negative feedback signal to said third amplifier input terminal of said first amplifier; and second negative feedback loop means for applying said second composite signal as a negative feedback signal to said third amplifier input terminal of said second amplifier.

2. A circuit as recited in claim 1, further comprising a pair of adjustable resistors connected in series between said junctions of said first and second pairs of resistors for adjusting the negative feedback of said first and second loop means with respect to said reference signals and said signal-to-be-detected, and an adjustable common resistor connected between the junction of said pair of adjustable resistors and a point of ground potential for adjusting the negative feedback with respect to said signal-to-be-detected only.

References Cited

UNITED STATES PATENTS

| | | | |
|---|---|---|---|
| 2,751,555 | 6/1956 | Kirkpatrick | 324—89 |
| 3,068,411 | 12/1962 | Galman | 324—87 |

OTHER REFERENCES

Malmstadt and Enke, Electronics for Scientists, Benjamin, Inc., New York, 1963, pp. 202–206.

RUDOLPH V. ROLINEC, *Primary Examiner.*

WALTER L. CARLSON, *Examiner.*

P. F. WILLE, *Assistant Examiner.*